(12) United States Patent
Walley

(10) Patent No.: US 12,420,703 B2
(45) Date of Patent: Sep. 23, 2025

(54) MARSHALLING STATUS COMMUNICATION TO A VEHICLE OBSERVER

(71) Applicant: Ford Global Technologies, LLC, Dearborn, MI (US)

(72) Inventor: George Edmund Walley, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 18/178,677

(22) Filed: Mar. 6, 2023

(65) Prior Publication Data

US 2024/0300407 A1    Sep. 12, 2024

(51) Int. Cl.
  *B60Q 1/50*   (2006.01)
  *B60Q 1/26*   (2006.01)
  *B60Q 5/00*   (2006.01)

(52) U.S. Cl.
  CPC .......... *B60Q 1/507* (2022.05); *B60Q 1/2661* (2013.01); *B60Q 5/005* (2013.01)

(58) Field of Classification Search
  CPC ...... B60Q 1/507; B60Q 1/2661; B60Q 5/005; B60Q 1/543
  See application file for complete search history.

(56) References Cited

U.S. PATENT DOCUMENTS

| | | | |
|---|---|---|---|
| 7,042,345 B2 | 5/2006 | Ellis | |
| 9,475,422 B2 | 10/2016 | Hillis et al. | |
| 10,040,390 B2 | 8/2018 | Dudar | |
| 10,339,815 B1 | 7/2019 | Sin | |
| 11,084,418 B2 | 8/2021 | Hong | |
| 11,305,731 B2 | 4/2022 | Hayakawa | |
| 11,383,634 B2 | 7/2022 | Martin et al. | |
| 2002/0003571 A1* | 1/2002 | Schofield | B60R 1/04 348/148 |
| 2014/0266658 A1* | 9/2014 | Feldman | B60Q 5/005 340/438 |
| 2016/0171894 A1* | 6/2016 | Harvey | G05D 1/0027 701/23 |
| 2018/0018875 A1* | 1/2018 | Zhang | B60Q 1/34 |
| 2019/0111838 A1* | 4/2019 | Hanson | G08G 1/163 |
| 2019/0225142 A1* | 7/2019 | Switkes | B60Q 1/507 |
| 2019/0259286 A1 | 8/2019 | Kim | |
| 2019/0322210 A1* | 10/2019 | Han | B60Q 1/0023 |
| 2020/0193837 A1* | 6/2020 | Grolle | B60Q 1/543 |
| 2022/0307227 A1* | 9/2022 | Pfaff | B62D 33/06 |
| 2023/0023013 A1* | 1/2023 | Nishitani | G08G 1/202 |

OTHER PUBLICATIONS

Chintalacheruvu, N., "Video based vehicle detection for advance warning Intelligent Transportation System," UNLV Retrospective Theses & Dissertations, Jan. 1, 2007, 135 pages.

* cited by examiner

*Primary Examiner* — Ryan W Sherwin
(74) *Attorney, Agent, or Firm* — Vincent Mastrogiacomo; Brooks Kushman P.C.

(57) ABSTRACT

A system for communicating a marshalling status of a vehicle to an observer located outside a vehicle. A memory storing instructions executable by a processor includes instructions to receive a marshalling command by the vehicle from a marshalling controller. The vehicle's marshalling state is changed in response to the marshalling command. The marshalling state is mapped to an optical output encoded for and understandable to the human observer. At least a first status light is illuminated according to the optical output.

20 Claims, 3 Drawing Sheets

| Marshalling state | Optical output | | Sound output |
|---|---|---|---|
| | Primary status lights | Secondary status lights | |
| Connected | Steady green | Steady green | Off |
| Disconnected | Slow-blink blue | Steady green | Off |
| Fault | Fast-blink red | Fast-blink red | Three honks, pause |
| Need assistance | Fast-blink red | Fast-blink green | Off |
| Never yet connected | Steady blue | Off | Off |
| Destination received | Steady green | Steady orange | Off |
| No Destination | Steady green | Steady orange | Off |
| Not moving | Steady green | Steady orange | Off |

*Fig. 2*

MARSHALLING STATUS COMMUNICATION TO A VEHICLE OBSERVER

BACKGROUND

Some facilities may require many vehicles to be moved around throughout the day. These environments may include, for example, automobile factories, rental car lots, bus depots, and valet parking garages. Coordinated movement of a large number of vehicles is referred to as a vehicle marshalling.

BRIEF DESCRIPTION OF THE DRAWINGS

FIG. 2 shows an example mapping of marshalling states to optical and sound outputs.

DETAILED DESCRIPTION

The present description discloses systems and methods for communicating a marshalling status of a vehicle to an observer located outside the vehicle. As discussed above, some environments may include a large number of vehicles to be moved or "marshalled" around a facility by a computer controller. When no one is in the vehicle and the vehicle is being controlled to operate autonomously, communications described herein can, for example, indicate that the vehicle is under the control of the marshalling system, about to move, and/or experiencing an error and needing assistance. The description below discloses using exterior and/or interior vehicle lighting to communicate a vehicle's marshalling status to an human observer located outside the vehicle.

Figure 1:
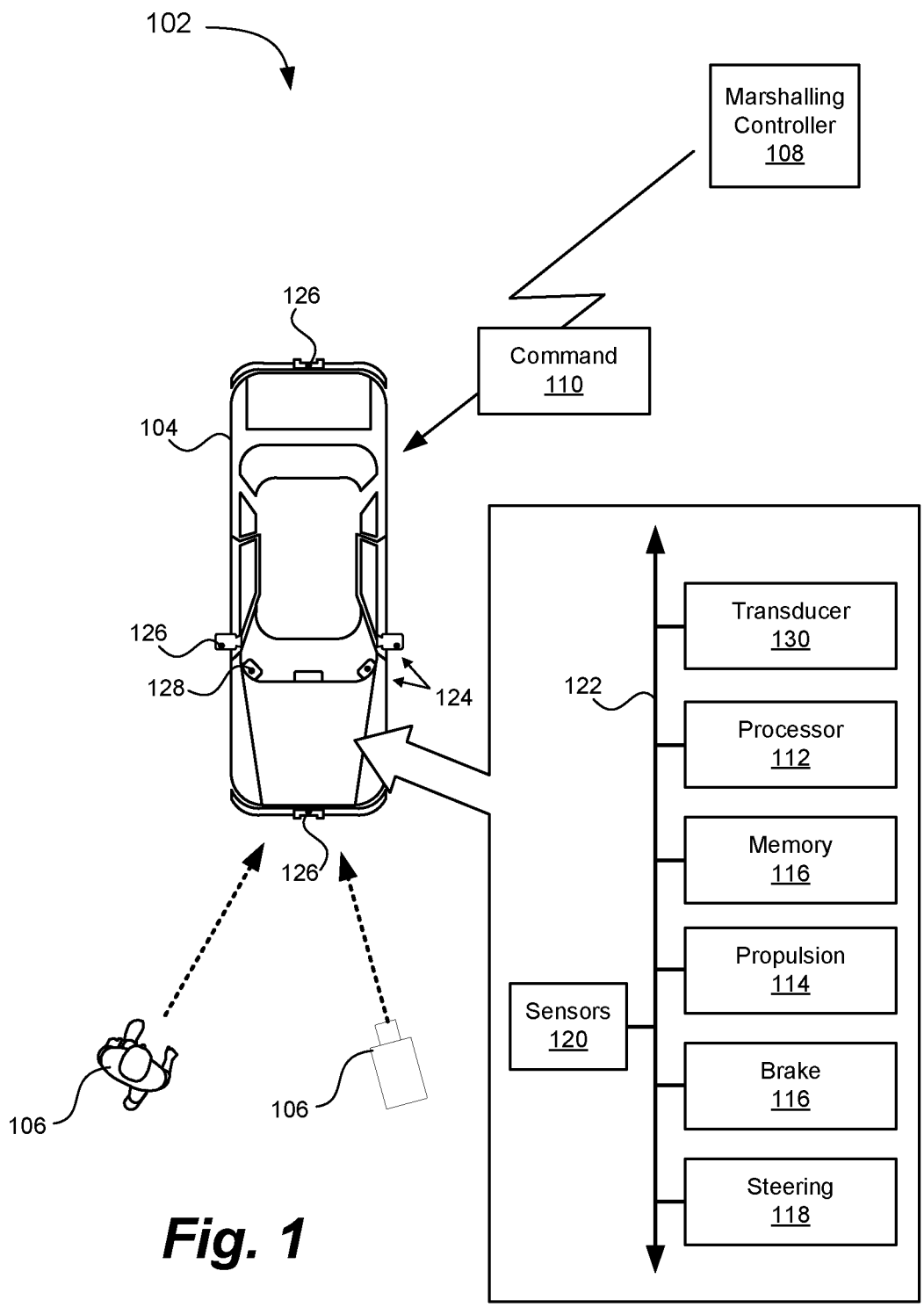
FIG. 1 shows an example system for communicating a marshalling status of a vehicle to an observer located outside the vehicle.
Figure 3:
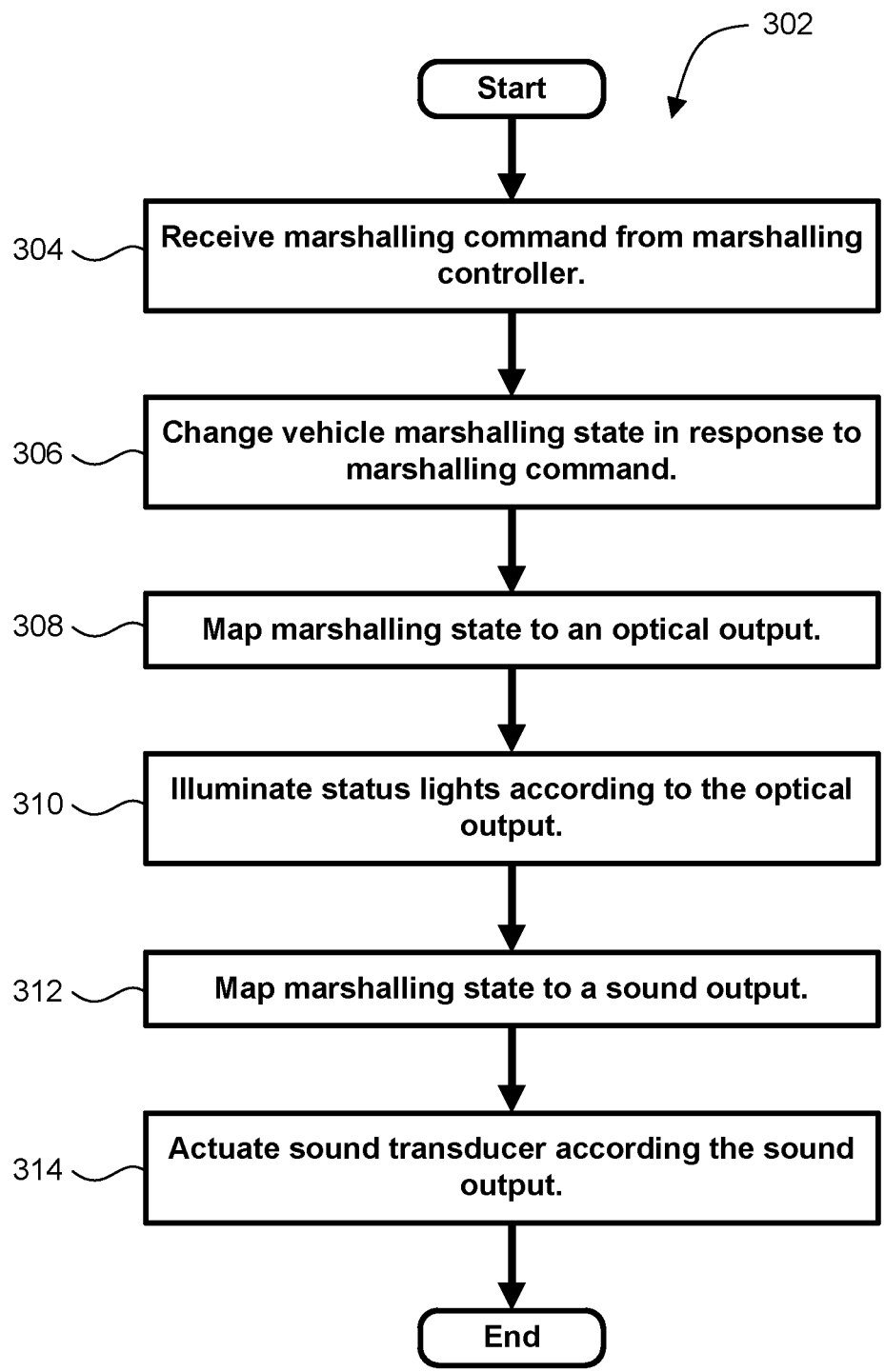
FIG. 3 shows an example method for communicating a marshalling status of a vehicle to an observer located outside the vehicle.

Throughout the description reference is made to FIGS. 1-3. When referring to the figures, like structures and elements shown throughout are indicated with like reference numerals.

In one exemplary configuration, a system for communicating a marshalling status includes a processor and a memory. The memory stores instructions executable by the processor to receive a marshalling command by a vehicle from a marshalling controller. The instructions also include instructions to change a marshalling state of the vehicle in response to the marshalling command and map the marshalling state of the vehicle to an optical output selected from a group of optical outputs. The optical output is encoded for an observer located outside the vehicle when displayed by at least a first status light at the vehicle. The memory further stores instructions to illuminate the first status light at the vehicle according to the optical output.

The group of optical outputs may include a steady on mode, a fast-blinking mode, and a slow-blinking mode displayed by the first status light, or a light and/or symbol projected on a surface such as the ground. The group of optical outputs may include a plurality of status colors and the optical output includes a status color from the plurality of status colors. In another configuration, the group of optical outputs includes a plurality of blink patterns, and the optical output includes a blink pattern from the plurality of blink patterns.

The first status light may be a non-navigation light mounted to an exterior of the vehicle. For example, the first status light may be positioned on a side-view mirror of the vehicle. In another implementation, the first status light may be positioned at an interior of the vehicle.

The system may include instructions to illuminate a second status light at the vehicle according to the optical output. The optical output may be encoded as a combination of illuminations from at least the first status light and the second status light.

In one configuration, the first status light and the second status light are located at an exterior of the at the vehicle. In another configuration, the first status light is located at an exterior of the vehicle and the second status light is located at an interior of the vehicle.

The marshalling state of the vehicle may be, for example, connected to the marshalling controller state, a disconnected from the marshalling controller state, or an error state.

In one implementation, the system includes instructions to map the marshalling state of the vehicle to a sound output selected from a group of sound outputs. The sound output is configured to be encoded for the human observer located outside the vehicle when actuated by a sound transducer at the vehicle. Actuating instructions actuate the sound transducer according to the sound output. The group of sound outputs may include a plurality of repeating tones generated by the sound transducer.

Another example configuration is a method for communicating a marshalling status of a vehicle to an observer located outside the vehicle. A receiving step receives a marshalling command by a vehicle from a marshalling controller. A changing step changes a marshalling state of the vehicle in response to the marshalling command. A mapping step maps the marshalling state of the vehicle to an optical output selected from a group of optical outputs. The optical output is encoded for and understandable to an observer located outside the vehicle when displayed by at least a first status light at the vehicle. An illuminating step illuminates the first status light at the vehicle according to the optical output.

The group of optical outputs may include a plurality of status colors and the optical output includes a status color from the plurality of status colors. In another configuration, the group of optical outputs includes a plurality of blink patterns, and the optical output includes a blink pattern from the plurality of blink patterns.

The marshalling state of the vehicle may be, for example, connected to the marshalling controller state, a disconnected from the marshalling controller state, or an error state.

One implementation includes illuminating a second status light at the vehicle according to the optical output. The optical output may be encoded as a combination of illuminations from at least the first status light and the second status light.

The method may include a further mapping step where the marshalling state of the vehicle is mapped to a sound output selected from a group of sound outputs. The sound output is configured to be encoded for and understandable to the human observer located outside the vehicle when actuated by a sound transducer at the vehicle. An actuating step actuates the sound transducer according to the sound output.

Another implementation may include a computer program product for communicating a marshalling status of a vehicle to an observer located outside the vehicle. The computer program product includes computer readable program code configured to receive a marshalling command by the vehicle from a marshalling controller, change a marshalling state of the vehicle in response to the marshalling command, map the marshalling state of the vehicle to an optical output selected from a group of optical outputs, and illuminate the first status light at the vehicle according to the optical output. The optical output is configured to be encoded for and understandable by the human observer located outside the vehicle when displayed by at least a first status light at the vehicle.

FIG. 1 shows an example system 102 for communicating a marshalling status of a vehicle 104 to an observer 106 located outside the vehicle 104. The vehicle 104 may be any passenger or commercial automobile such as a car, a truck, a sport utility vehicle, a crossover, a van, a minivan, a taxi, a bus, etc. FIG. 1 shows both a human observer 106 and a machine vision observer or camera 106. That is, optical output described herein could be encoded and/or provided to a human observer 106, a machine vision observer 106, or both. For example, a human observer 106 could view optical output to make a determination about a vehicle status. Alternatively or additionally, a machine vision observer 106 could use one or more cameras to receive optical output, that then could be decoded using any suitable machine vision technique to recognize output colors, intensities, patterns, etc., of lights. A machine vision observer could further include programming to then determine, based on decoded optical signals, a location and/or identity of a vehicle 102, whether the vehicle 102 is at an intended, desired, or predicted location, whether vehicle 102 lights are working properly (e.g., whether a fault condition is identified based on the optical output), etc.

The system 102 may include a computerized marshalling controller 108 directing the movement of multiple vehicles in the system environment. For instance, the system environment may be a vehicle assembly plant, a parking lot, business depot, or similar environment where possibly hundreds of vehicles are marshalled to various locations throughout the day. The marshalling controller 108 may include a centralized server that transmits a marshalling command 110 to the vehicle 104 directing the vehicle 104 to, for example, move a particular location in the system environment.

The vehicle 104 may be an autonomous vehicle. A computer processor 112 can be programmed to operate the vehicle 104 independently of the intervention of a human operator, completely or to a lesser degree. The computer processor 112 may be programmed to operate a propulsion system 114, a brake system 116, a steering system 118, and/or other vehicle systems based on the marshalling command 110 and data received from vehicle sensors 120. For the purposes of this disclosure, autonomous operation means the computer processor 112 controls the propulsion system 114, brake system 116, and steering system 118 without input from a human operator. Semi-autonomous operation means the computer processor 112 controls one or two of the propulsion system 114, brake system 116, and steering system 118 and a human operator controls the remainder. Nonautonomous operation means a human operator controls the propulsion system 114, brake system 116, and steering system 118.

The computer processor 112 is a microprocessor-based computing device, such as a generic computing device including an electronic controller or the like, a field-programmable gate array (FPGA), an application-specific integrated circuit (ASIC), or a combination of the foregoing. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. Memory 116 can include media for storing instructions executable by the computer processor 112 as well as for electronically storing data and/or databases, and/or the computer processor 112 can include structures such as the foregoing by which programming is provided. The computer processor 112 can be multiple computer processors coupled together.

The computer processor 112 may transmit and receive data through a communications network 122 such as a controller area network (CAN) bus, Ethernet, WiFi, Local Interconnect Network (LIN), onboard diagnostics connector (OBD-II), and/or by any other wired or wireless communications network. The computer processor 112 may be communicatively coupled to the vehicle sensors 120, the propulsion system 114, the brake system 116, the steering system 118, the memory 116, and other components via the communications network 122.

The vehicle sensors 120 may provide data about operation of the vehicle 104, for example, wheel speed, wheel orientation, and engine and transmission data (e.g., temperature, fuel consumption, etc.). The vehicle sensors 120 may detect the location and/or orientation of the vehicle 104. For example, the vehicle sensors 120 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The vehicle sensors 120 may detect the external world, e.g., the objects and/or characteristics of surroundings of the vehicle 104, such as other vehicles, road lane markings, traffic lights and/or signs, pedestrians, etc. For example, the vehicle sensors 120 may include radar sensors, scanning laser range finders, light detection and ranging (LIDAR) devices, and image processing sensors such as cameras.

The propulsion system 114 of the vehicle 104 generates energy and translates the energy into motion of the vehicle 104. The propulsion system 114 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 114 can include an electronic control unit (ECU) or the like that is in communication with and receives input from the computer processor 112 and/or a human operator. The human operator may control the propulsion system 114 via, for example, an accelerator pedal and/or a gear-shift lever.

The brake system 116 is a vehicle braking subsystem and resists the motion of the vehicle 104 to thereby slow and/or stop the vehicle 104. The brake system 116 may include friction brakes such as disc brakes, drum brakes, band brakes, etc.; a brake booster; regenerative brakes; any other suitable type of brakes; or a combination. The brake system 116 can include an electronic control unit (ECU) or the like that is in communication with and receives input from the computer processor 112 and/or a human operator. The human operator may control the brake system 116 via, for example, a brake pedal.

The steering system 118 is typically a conventional vehicle steering subsystem and controls the turning of the wheels. The steering system 118 may be a rack-and-pinion system with electric power-assisted steering, a steer-by-wire system, as both are known, or any other suitable system. The steering system 118 can include an electronic control unit (ECU) or the like that is in communication with and receives input from the computer processor 112 and/or a human operator. The human operator may control the steering system 118 via, for example, a steering wheel.

The vehicle 104 may include status lights 124 mounted on the exterior and/or interior of the vehicle 104. The status lights 124 may be non-navigation lights. As used herein, navigation lights are lights used to illuminate the roadway and to communicate the vehicle's intended direction during travel. Navigation lights may include vehicle headlights, fog lights, taillights, brake lights, turn signal lights, and backup lights. Non-navigation lights are lights not used to illuminate the roadway or to communicate the vehicle's intended direction of travel. Non-navigation lights can include, for example, surround lights, perimeter lights, license plate lights, puddle lights, underlighting, and interior lights.

In one configuration, the status lights 124 include one or more first status lights 126 and one or more second status lights 128. The adjective "first" and "second" is used as an identifier to distinguish between two lights or sets of lights of the vehicle and does not indicate order or importance. It is contemplated that both the first status lights 126 and the second status lights 128 may be mounted to an exterior of the vehicle 104. For example, first status lights 126 may be license plate lights and the second status lights 128 may be puddle lights positioned on a side-view mirror of the vehicle 104. Alternatively, both the first status lights 126 and the second status lights 128 may be mounted to an interior of the vehicle 104. For example, first status lights 126 may be cabin lights and the second status lights 128 may be console display LEDs. In another configuration, the first status lights 126 may be mounted to an exterior of the vehicle 104 while the second status lights 128 may be mounted to an interior of the vehicle 104. For example, the primary lights 126 may be license plate and puddle lights and the secondary lights 128 may be cabin lights. It is further contemplated that additional lights may be used to communicate marshalling status to the human observer 106. The first and second status lights are illustrative of a plurality of status lights 124. The scope of configurations contemplated herein are not necessarily limited to two sets of status lights 124.

The memory 116 can store instructions executable by the processor 112. These instructions include instructions to receive the marshalling command 110 by the vehicle 104 from the marshalling controller 108. The marshalling command 110 may include, for example, vehicle motion directives and/or vehicle power management directives. In response to the marshalling command 110, the instructions may cause the vehicle 104 to enter into one of a plurality of marshalling states. For example, the marshalling states may be connected to the marshalling controller state, disconnected from the marshalling controller state, or error state. These marshalling states are for illustration purposes and the system 102 may include many more marshalling states.

The instructions may further include instructions to map the marshalling state of the vehicle 104 to an optical output that is encoded for and understandable by the human observer 106 located outside the vehicle 104 when displayed by the first status lights 126 and/or the second status lights 128. The optical output may be one of a group of optical outputs used to represent the marshalling state of the vehicle 104. For example, the group of optical outputs may consist of a plurality of status colors displayed by the first status lights 126 and/or second status lights 128.

The group of optical outputs may additionally or optionally include various blink patterns displayed by the first status lights 126 and/or second status lights 128. For example, the blink patterns may include a steady on mode, a fast-blinking mode, a slow-blinking mode, and a pulsing mode. Various combinations of colors and blink patters for first status lights 126 and/or second status lights 128 may be used to communicate numerous marshalling states to the human observer 106.

FIG. 2 shows an example mapping of marshalling states. Depending on the number of marshalling states and the illumination capabilities of the vehicle 104, the mapping of marshalling states to optical outputs may be, for example, a one-to-one mapping or a many-to-one mapping. In FIG. 2, the destination received, no destination, and not moving states are all mapped to the same optical output of steady green/steady orange. This is a many-to-one mapping example. It is contemplated the mapping marshalling states to optical outputs may be performed by querying a lookup table or the like stored in memory 116.

The instructions may further include instructions to illuminate the first status lights 126 and/or second status lights 128 according to the optical output. As discussed, the optical output may be encoded as a combination of illuminations from the first status lights 126 and the second status lights 128. By illuminating the first status lights 126 and/or second status lights 128, pedestrians and other people on the facility floor can receive a quick visual indication of a vehicle's marshalling status.

In one configuration, the vehicle may include one or more sound transducers 130, such as a horn, an alarm siren, and/or a speaker system. The instructions may further map the marshalling state of the vehicle to a sound output selected from a group of sound outputs. Similar to the optical output, the sound output is encoded for and understandable to the human observer 106 located outside the vehicle 104 when actuated by the sound transducer 130. The group of sound outputs may include, for example, various repeating tones generated by the sound transducer. As shown in FIG. 2, the fault marshalling state is mapped, for example, to a pattern of three short car horn honks and a long pause. The instructions may include instructions to actuate the sound transducer according to the sound output.

The system 102 can advantageously assist people located in a marshalling environment quickly determine which vehicles are under autonomous control and which vehicles are under human control by inspecting various exterior and/or interior vehicle lights. For vehicles potentially under autonomous control, an observer can quickly determine, for example, whether a vehicle 104 is connected or disconnected to the marshaling controller 108, actively engaged in driving, stopped intentionally (no faults), stopped or blocked by some sort of vehicle error, or stopped or blocked by real or perceived objects in its path.

FIG. 3 shows an example method 302 for communicating vehicle status to an observer 106 located outside a vehicle 104. As mentioned, the memory 116 of the vehicle 104 may store executable instructions for performing the steps described below.

The method 302 includes receiving operation 304 to receive a marshalling command 110 by a vehicle 104 from a marshalling controller 108. In one configuration, the marshalling command 110 is transmitted wirelessly using, for example, a cellular network, a radio communication system, a Bluetooth® network, or a IEEE 802.11 network. As discussed above, a marshalling controller 108 may be used in environments where numerous vehicles may need to be relocated throughout the day, such as a factory or parking garage. The marshalling command 110 may include vehicle motion directives and/or vehicle power management directives. After receiving operation 304, control passes to changing operation 306.

At changing operation 306, the marshalling state is changed in response to the marshalling command 110. Various marshalling states may be defined by the system 102, such as a connected to the marshalling controller state, a disconnected from the marshalling controller state, and an error state (see FIG. 2). After changing operation 306, control passes to mapping operation 308.

At mapping operation 308, the marshalling state of the vehicle is mapped to an optical output selected from a group of optical outputs. The optical outputs are configured such that they are encoded for and understandable to an observer 106 located outside the vehicle 104 when displayed by a first status light 126 and/or a second status light 128 at the vehicle 104. For instance, the human observer 106, when looking down a line of vehicles in a facility, will be able to quickly determine which vehicles are under automated marshalling control, which vehicles are not, which vehicles are in motion and which are blocked, and which vehicles need assistance.

The group of optical outputs may include a plurality of blink patterns and the optical output includes a blink pattern selected from the plurality of blink patterns. For example, the group of optical outputs can include a steady on mode, a fast-blinking mode, and a slow-blinking mode displayed by the first status light. The group of optical outputs may include a plurality of status colors and the optical output includes a status color selected from the plurality of status colors.

The first status light 126 may be a non-navigation light to communicate meaning more clearly. That is, the first status light 126 is not used to illuminate the roadway or to communicate the vehicle's intended direction of travel. Using non-navigation lighting can avoid confusion with driving lights (e.g., headlights, high-beam lights, hazard lights, turn lights, etc.) that already have commonly understood meaning when driving.

In one configuration, the first status light 126 is a non-navigation light mounted to an exterior of the vehicle. For example, the first status light 126 may be positioned on a side-view mirror of the vehicle. Alternatively, the first status light 126 may be positioned at an interior of the vehicle 104, such in the vehicle passenger cabin. Use of non-navigation status lights 124 can visually provide an unambiguous marshalling status indication because navigation lights can have traditional meanings not associated with a vehicle's marshalling status.

As discussed above, the optical output may be encoded as a combination of illuminations from at least the first status light 126 and the second status light 128. Both the first status light 126 and the second status light 128 may be located at an exterior of the at the vehicle 104. Other configurations, such as both the first status light 126 and the second status light 128 located at an interior of the at the vehicle 104, or the first status light 126 located at an exterior of the vehicle 104 and the second status light 128 is located at an interior of the vehicle 104, are contemplated. After mapping operation 308, control passes to illuminating operation 310.

At illuminating operation 310, the first status light 126 and/or the second status light 128 at the vehicle 104 are illuminated according to the optical output. If color is used to communicate the marshalling state, the mapping operation 310 may include controlling RGB voltage levels of LED elements in the status lights. After illuminating operation 310, control passes to mapping operation 312.

At mapping operation 312, the marshalling state of the vehicle 104 is mapped to a sound output selected from a group of sound outputs. The group of sound outputs may include a plurality of repeating tones generated by the sound transducer 130, with the sound output being encoded for and understandable to the human observer 106 located outside the vehicle 104. For example, when the vehicle 104 enters an error marshalling state, the marshalling state may be mapped to a repeating pattern of three short bursts of the vehicle horn followed by a long pause. The sound output may be used to call attention to urgent conditions in the marshalling system. After mapping operation 312, control passes to actuating operation 314.

At actuating operation 314, the sound transducer 130 is actuated according to the sound output. As discussed above, the actuating operation 314 may include activating a horn, an alarm siren, and/or a speaker system for example.

The descriptions of the various examples and implementations have been presented for purposes of illustration but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical enhancements over technologies found in the marketplace, or to enable others of ordinary skill in the art to understand the implementations disclosed herein.

As will be appreciated, the methods and systems described may be implemented as a computer program product. The computer program product may include a computer readable storage medium (or media) having computer readable program instructions thereon for causing a processor to carry out operations discussed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry.

Various implementations are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
    a processor and a memory, the memory storing instructions executable by the processor, including instructions to:
        receive a marshalling command to move and/or change a power state of a vehicle by a vehicle from a marshalling controller that is not included on the vehicle or another vehicle;
        in response to the marshalling command to move and/or change the power state of the vehicle, change a marshalling state of the vehicle from connected to the marshalling controller to disconnected from the marshalling controller, or from disconnected from the marshalling controller to connected to the marshalling controller;
        map the marshalling state of the vehicle to an optical output selected from a group of optical outputs, the optical output being encoded for an observer located outside the vehicle when displayed by at least a first status light at the vehicle; and
        illuminate the first status light at the vehicle according to the optical output.

2. The system of claim 1, wherein the group of optical outputs includes a steady on mode, a fast-blinking mode, and a slow-blinking mode displayed by the first status light.

3. The system of claim 1, further comprising:
    wherein the group of optical outputs includes a plurality of status colors; and wherein the optical output includes a status color from the plurality of status colors.

4. The system of claim 1, further comprising:
wherein the group of optical outputs includes a plurality of blink patterns; and
wherein the optical output includes a blink pattern from the plurality of blink patterns.

5. The system of claim 1, wherein the first status light is a non-navigation light mounted to an exterior of the vehicle.

6. The system of claim 5, wherein the first status light is positioned on a side-view mirror of the vehicle.

7. The system of claim 1, wherein the first status light is positioned at an interior of the vehicle.

8. The system of claim 1, wherein the marshalling state of the vehicle includes an error state.

9. The system of claim 1, further comprising:
wherein the instructions include instructions to illuminate a second status light at the vehicle according to the optical output; and
wherein the optical output is encoded as a combination of illuminations from at least the first status light and the second status light.

10. The system of claim 9, wherein the first status light and the second status light are located at an exterior of the vehicle.

11. The system of claim 9, wherein the first status light is located at an exterior of the vehicle and the second status light is located at an interior of the vehicle.

12. The system of claim 1, wherein the instructions include instructions to:
map the marshalling state of the vehicle to a sound output selected from a group of sound outputs, the sound output encoded for the observer located outside the vehicle when actuated by a sound transducer at the vehicle; and
actuate the sound transducer according to the sound output.

13. The system of claim 12, wherein the group of sound outputs includes a plurality of repeating tones generated by the sound transducer.

14. A method comprising:
receiving a marshalling command to move and/or change a power state of a vehicle by a vehicle from a marshalling controller that is not included on the vehicle or another vehicle;
in response to the marshalling command to move and/or change the power state of the vehicle, changing a marshalling state of the vehicle from connected to the marshalling controller to disconnected from the marshalling controller, or from disconnected from the marshalling controller to connected to the marshalling controller;
mapping the marshalling state of the vehicle to an optical output selected from a group of optical outputs, the optical output being encoded for an observer located outside the vehicle when displayed by at least a first status light at the vehicle; and
illuminating the first status light at the vehicle according to the optical output.

15. The method of claim 14, wherein the marshalling state of the vehicle includes an error state.

16. The method of claim 14, wherein the group of optical outputs includes a status color from a plurality of status colors displayed by the first status light.

17. The method of claim 14, wherein the group of optical outputs includes a blink pattern from a plurality of blink patterns displayed by the first status light.

18. The method of claim 14, further comprising:
illuminating a second status light at the vehicle according to the optical output; and
wherein the optical output is encoded as a combination of illuminations from at least the first status light and the second status light.

19. The method of claim 14, further comprising:
mapping the marshalling state of the vehicle to a sound output selected from a group of sound outputs, the sound output encoded for the observer located outside the vehicle when actuated by a sound transducer at the vehicle; and
actuating the sound transducer according to the sound output.

20. A computer program product for communicating a vehicle status to an observer located outside a vehicle, the computer program product comprising:
a non-transitory computer readable storage medium having computer readable program code embodied therewith, the computer readable program code configured to:
receive a marshalling command to move and/or change a power state of a vehicle by a vehicle from a marshalling controller that is not included on the vehicle or another vehicle;
in response to the marshalling command to move and/or change the power state of the vehicle, change a marshalling state of the vehicle from connected to the marshalling controller to disconnected from the marshalling controller, or from disconnected from the marshalling controller to connected to the marshalling controller;
map the marshalling state of the vehicle to an optical output selected from a group of optical outputs, the optical output being encoded for and understandable to the observer located outside the vehicle when displayed by at least a first status light at the vehicle; and
illuminate the first status light at the vehicle according to the optical output.

* * * * *